United States Patent [19]

Kullberg

[11] E Re. 30,493

[45] Reissued Jan. 27, 1981

[54] APPARATUS FOR THE PREVENTION OR LIMITATION OF WATER DAMAGE

[76] Inventor: Bengt G. A. E. Kullberg, Storövägen 20, S-141 42 Huddinge, Sweden

[21] Appl. No.: 49,184

[22] Filed: Jun. 18, 1979

Related U.S. Patent Documents

Reissue of:

[64] Patent No.: 4,136,823
Issued: Jan. 30, 1979
Appl. No.: 769,667
Filed: Feb. 17, 1977

[30] Foreign Application Priority Data

Feb. 26, 1976 [SE] Sweden ..... 7602561
May 21, 1976 [SE] Sweden ..... 7605806

[51] Int. Cl.[3] ..... H01H 35/00; F24D 3/00
[52] U.S. Cl. ..... 237/8 R; 237/8 A; 137/312; 4/427; 236/68 B
[58] Field of Search ..... 237/8 R, 8 A; 236/68 B; 137/312, 362; 4/428, 427, 252 A, 1

[56] References Cited

U.S. PATENT DOCUMENTS

| | | | |
|---|---|---|---|
| 2,538,221 | 1/1951 | Wilber | 237/8 R |
| 3,770,002 | 11/1973 | Brown | 137/312 |
| 3,818,874 | 6/1974 | Tria | 137/312 |
| 3,920,031 | 11/1975 | Maxfield | 137/312 |
| 3,943,983 | 3/1976 | Gelfand | 137/312 |
| 3,945,564 | 3/1976 | Smallegan | 236/68 B |
| 4,041,557 | 8/1977 | Ringler | 237/8 R |

*Primary Examiner*—Henry C. Yuen
*Attorney, Agent, or Firm*—Schroeder, Siegfried, Ryan, Vidas, Steffey & Arrett

[57] ABSTRACT

The invention relates to an apparatus for preventing or limiting water damage caused by leakage from pipes or appliances in which a sensing element in the form of a pair of conductors having current applied thereto is positioned in an area to sense accumulation of water from leakage. The sensing element is connected to a resettable relay to operate the same when current flows between conductors of the sensing element. The relay is bi-stable and resettable and operates to disconnect the sensing element after initial conduction and to further apply heat through the heating element to a thermostatic valve to operate the thermostatic valve in a direction to close off water flow to piping or apparatus in which leakage occurs.

9 Claims, 5 Drawing Figures

APPARATUS FOR THE PREVENTION OR LIMITATION OF WATER DAMAGE

Matter enclosed in heavy brackets [ ] appears in the original patent but forms no part of this reissue specification; matter printed in italics indicates the additions made by reissue.

The invention relates to an apparatus for preventing or limiting water damage on structural floors with covering floors when there is leakage from such water carrying means as pipes and armatures in circulation piping or distribution networks for central heating or consumable water and appliances connected to such piping, e.g. hot water radiators and washing machines.

Leakage in the piping and fittings in circulation circuits for central heating and in the districution network of a building for hot and cold consumption water, as well as leakages in radiators and water coming from defective dishwashers and washing machines is rather usual and causes considerable damage, especially in structural floors with covering floors, such damage making it necessary to make extensive and costly repairs.

The object of the invention is to provide a simple and cheap apparatus to prevent or at least limit such damage.

The intended result is achieved by making the apparatus according to the following claim 1.

An embodiment of the invention will now be described in the following while referring to the attached drawings.

Figure 1:
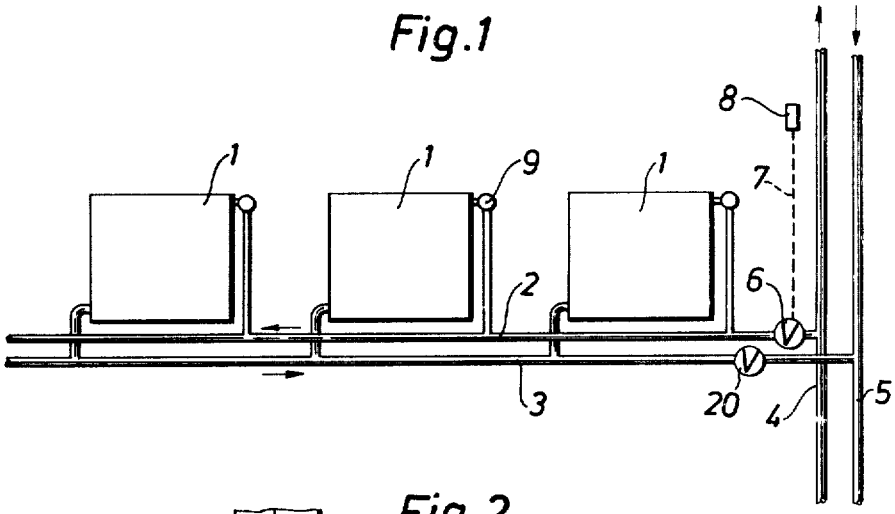
FIG. 1 shows schematically a view of a portion of a circulation circuit in a central heating installation for pumped hot water on one floor of a multistorey building.

A number of radiators 1, of which three are shown in FIG. 1, are connected to a supply pipe 4 and a return pipe 5 via horizontal pipes 2, 3.

In the delivery pipe 2 there is arranged a direct-acting thermostat valve 6. The bellows or piston acting on the valve body is connected, via a narrow bore pipe 7, to the sensing body 8 of the valve, this body being placed in a suitable location in a room heated by the radiators 1, to regulate room temperature in all the rooms where the radiators are connected to the delivery pipe 2 and are thus affected by the valve 6. Each radiator 1 has a valve 9 on the delivery side for manual throttling or closing.

Figure 2:
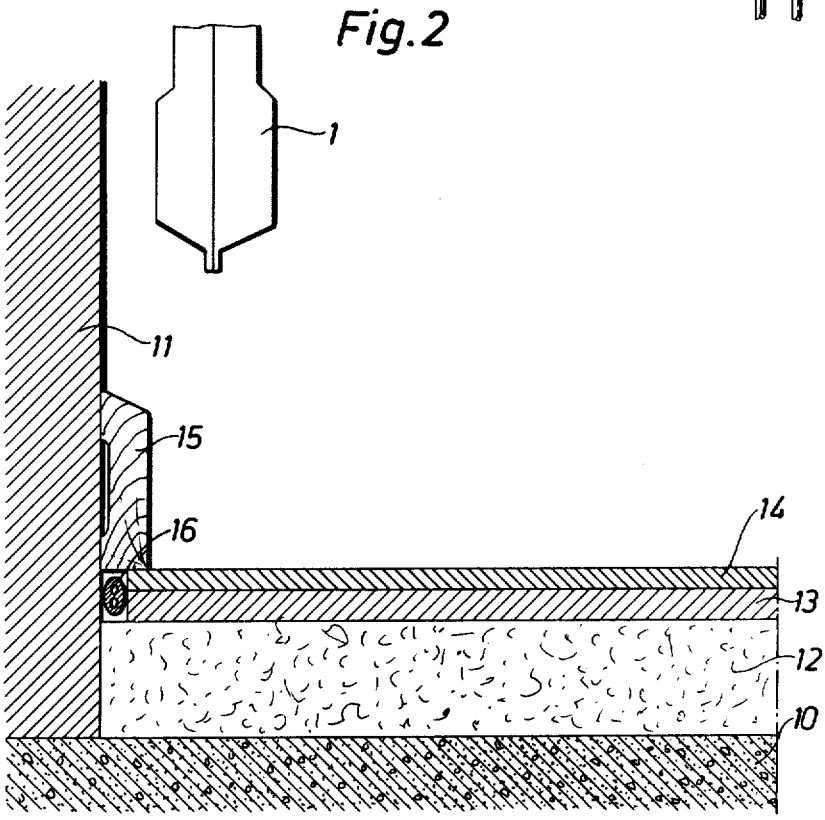
FIG. 2 shows a schematic side view of a radiator according to FIG. 1 with a sensing device arranged for detecting possible leaks.

In FIG. 2 the central heating plant is indicated, while excluding the piping, by a lower portion of one of the radiators 1. The wall 11, on which the radiator is suspended by attachment means not shown, rests on a concrete structural floor 10. The concrete structural floor 10 is provided with a sand bed 12 on which subflooring 13 is laid out to carry top flooring 14. A skirting board 15 is fitted round the wall 11 in a conventional manner, and nailed to the wall.

A moisture sensing device 16 is placed under the skirting board 15 on or in the sand bed 12 between the wall 11 and the flooring layers 13, 14.

Figure 3:
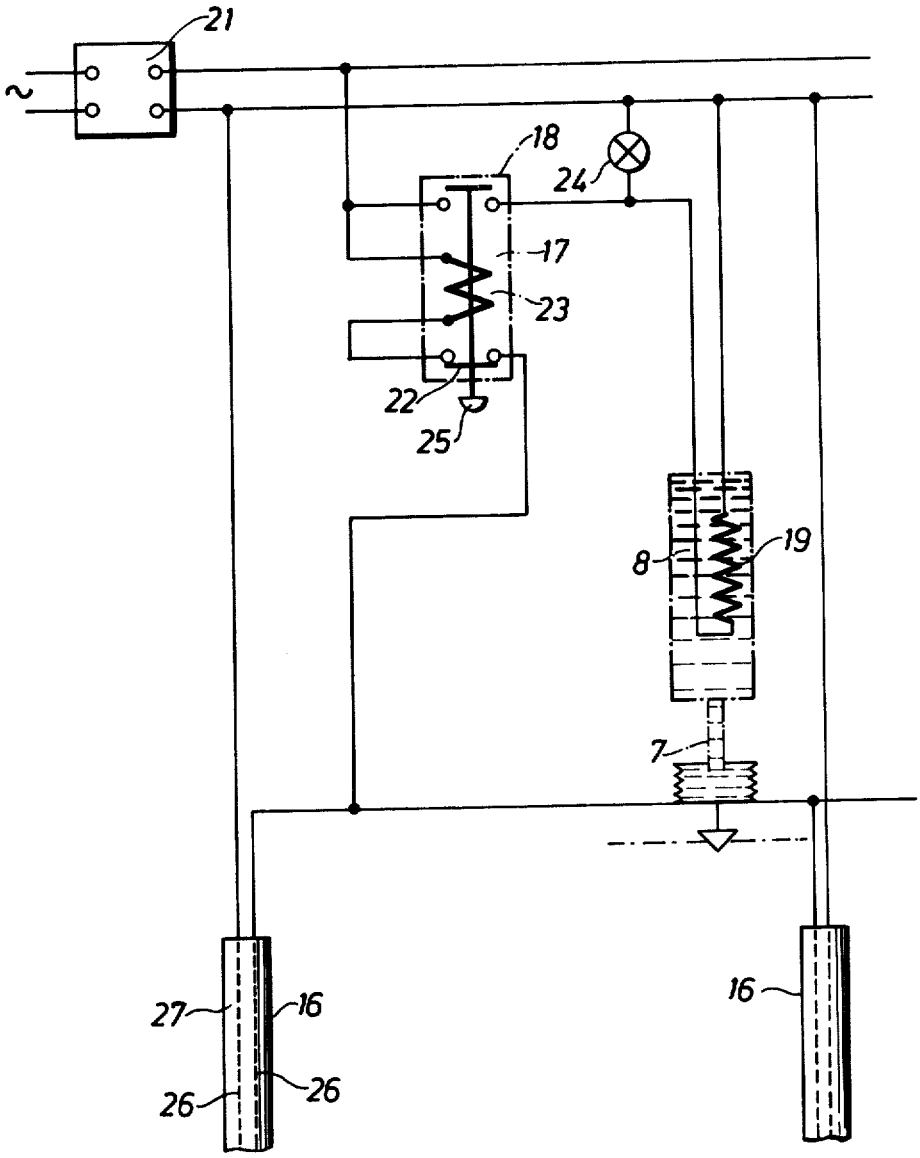
FIG. 3 is a principle sketch clarifying the coaction between the sensing device and a closing valve to the supply pipe for the radiators according to FIGS. 1 and 2.

As is apparent from FIG. 3 the sensing device 16 is electrically connected to a relay 17. Said relay is arranged to close a current circuit, on an impulse from the sensing device indicating that a predetermined moisture limit has been exceeded, over its switch 18 to feed an electric heating element 19 arranged to heat the sensing body 8 on the direct-acting thermostat valve 6 to actuate the valve for closing.

When the valve 6 closes, the hot water supply via the delivery pipe 2 to the radiators 1 is cut off. So that the return pipe 5 will not supply water from floors above to the radiators closed by the valve 6, there is a check valve 20 arranged at the connection of the return pipe 3 to the main return pipe 5.

A necessary number of sensing devices 16 are placed at floor level to sense leakage from any place along the piping 2, 3 before amounts of water large enough to cause a risk of the occurrance of damage which is difficult to repair have leaked out. Two such sensing devices are shown in FIG. 3. From the same figure it is further apparent that the control circuit is provided with current from a mains-connected transformer 21. A suitable voltage is 12 or 24 V. A number of sensing devices 16 (two are shown) which are distributed in the rooms served by the pipes 2, 3 are all supplied with the low-voltage current via a switch 22 in the relay 17. In this supply circuit there is also the operating coil 23 of the relay 17. The circuit is normally kept broken by the surroundings of the sensing device being dry. If a certain moisture limit is exceeded, the sensing device closes the circuit whereby the relay, which has a bistable function and must be manually reset, closes the current to the heating element 19 by means of its switch 18 and simultaneously breaks the current to the sensing device 16 by means of its switch 22. When the sensing body 8 is heated, this results in the valve 6 closing the hot water supply to the pipe 2 from the main supply pipe 4. The relay can naturally be arranged to light a lamp 24 or actuate some other signal device to indicate that a leak has occurred. After the leaking detail has been repaired, the condition of the sensing device 16 is checked with an eye to possibly exchanging it whereafter the relay 17 is reset manually by means of the button 25.

Each of the shown sensing devices 16 are of the kind consisting of two spaced electrical conductors 26 running one alongside the other bedded in a non-conducting moisture-absorbing material 27, e.g. cellular plastic or fibre composition. This material is in communication with the surroundings for taking up water and thereby become conducting. The relay breaks the current to these sensing devices after an impulse from one of them, to prevent the risk of fire during a drying stage.

According to FIG. 2, the sensing device 16 is placed as a reposing double conductor, while the sensing devices 16 in FIG. 3 are indicated as bar-like vertical bodies intended to be inserted into the sand bed 12 through drill holes in the flooring 13, 14 in front of the skirting board 15.

The electrical heating element 19 is to advantage built in to the sensitive body 8 for rapidly warming up the medium therein.

The relay can be of electromagnetic or electronic type and must naturally have a sensitivity suitable to the construction of the sensing device 16.

In known thermostat valves the heat sensitive body is arranged to sense the temperature of some medium surrounding the body. In order to provide a sufficiently great regulating force for actuating the regulating valve, these known thermostat valves, which must be able to give a regulating function for small variations in temperature, have been provided with mechanical amplifying means in the form of springs and the like. This has resulted in that the thermostat valves have necessarily been given a voluminous form. In spite of this amplification it has been found that the known valves have too small a regulating effect in certain cases. In normal operating conditions when the pressure in the pipe on both sides of the valve is substantially the same, there are no problems. If, on the other hand, the pressure drop across the valve is large due to a pipe break, greater regulating power is required on the valve, and this is thus difficult to achieve with valves known at present.

A thermostat valve which has been further developed to obviate said drawbacks has the heat sensitive body enclosed in a chamber, the inner temperature of which is independent of the temperature of the atmosphere surrounding the chamber, the heating element supplied with electricity being arranged in the chamber to give heat to the heat sensitive body. The heating element is connected to at least one electrical control means for regulating the valve compulsively.

With the further developed valve there is obtained the opportunity of compulsory regulation with different parallel and/or series-connected regulating means which are electrically connected in the supply circuit of the heating element. There are thus obtained valve regulating possibilities for different factors such as time, light, dampness and the like. The supply circuit of the heating element can be opened or closed by a time switch at different times, and the said circuit can be closed and opened with a photocell in response to light and darkness. Other factors are also conceivable for regulating the valve, which is particularly well-suited for utilization in the apparatus according to the invention for preventing or limiting water damage.

Figure 4:
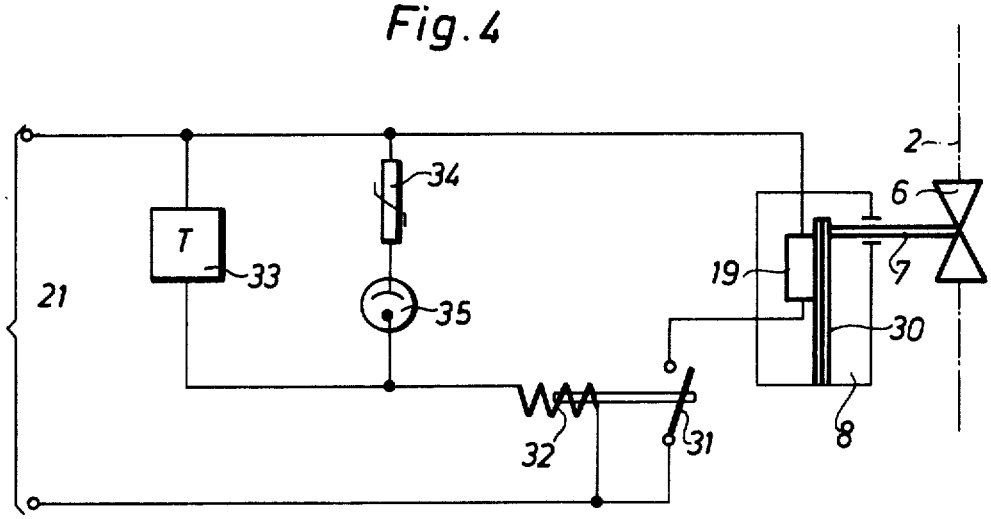
FIG. 4 shows the principle for a more developed thermostat valve.

The principle of the valve 6 is shown in FIG. 4, which also shows it fitted to the hot water delivery pipe 2 in a radiator installation (not shown). In the shown embodiment, the valve 6 is operated by an arm 7 connected with a bimetal means 30 in a sensing body 8. The interior space in the sensing body 8 is suitably completely insulated from the surrounding atmosphere so that the temperature occurring on the bimetal means 30 is solely dependent on a heating element 19 in the sensing body 8.

Figure 5:
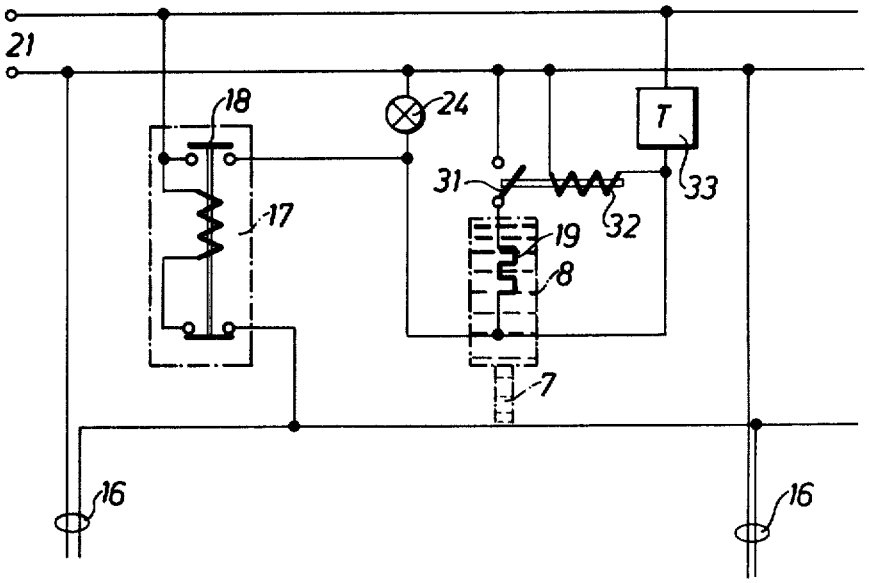
FIG. 5 shows a still further embodiment of the invention.

The sensing body 8 can also be conceived made as a chamber enclosing a medium, such as a fluid, into which the heating element 19 is inserted as shown in FIG. 5. The medium expands on heating and this expansion is utilized to actuate the valve 6 by the portion denoted by the numeral 7 constituting a pipe in communication with a bellows or piston for operating the valve 6.

In FIG. 4, the heating element 19 consists of an electrical resistance coupled into a supply circuit with terminals 21. A current source (not shown) is connected to the terminals 21. To obtain compulsive control only of the regulating valve, the supply circuit to the resistance 19 is provided with a switch 31 incorporated in a relay with the coil 32. The relay coil 32 is part of a control circuit with regulating means which are actuatable by different factors. There is thus shown a regulating means 33 in the form of a clock having the ability of being set to open and close the control current to the coil 32 at different times. There is further shown a series circuit of two regulating means, one a heat sensing thermistor 34 in series with a photocell 35 which, in coaction, can close the control current to the coil 32 for actuating the switch 31 so that the heating element 19 is warmed up.

In the embodiment shown in FIG. 4 the clock 33 is coupled in parallel with the series-coupled thermistor and photocell unit 34–35. The coil 32 can thus be supplied with current either at the times set on the clock 33 for closing the control current circuit, or when both the thermistor 34 and the photocell 35 are conducting. Other circuitry is naturally conceivable for obtaining other control conditions. It is thus conceivable to connect each of the regulating means 33, 34 and 35 in parallel or to couple two or more of them in series. Other regulating means, sensitive to other factors such as humidity, cold or the like, can also be included for control.

In FIG. 5 there is shown a circuiting device for an apparatus according to the invention for preventing water damage. As shown in FIG. 3 the moisture sensing devices 16 are connected via a bistable relay 17. When one of the devices 16 becomes conducting due to the presence of moisture, the relay 17 is switched to deliver current to the heating element 19 in the sensing body 8, a control lamp 24 being supplied with current simultaneously.

When the further developed valve is introduced into this circuitry, the supply circuit of the heating element 19 will also comprise the switch 31 with a control circuit of the kind described in conjunction with FIG. 4. The relay coil 32 operating the switch 31 is controlled by the clock 33 in the embodiment shown, but the clock can be exchanged or supplemented by one or more of the control means described in conjunction with FIG. 4. In order that the heating element 19 shall be supplied with current even when only the moisture sensing devices 16 have caused the bistable relay 17 to be switched, the relay coil 32 is also connected so that it can be supplied with current via one pair of contacts 18 of the bistable relay 17. Consequently, the switch 31 is energizable either by the circuit comprising the bistable relay 17 or by the control circuit with the control means 33.

As has already become apparent from the description so far, the valve can be modified in different ways. A further modification is that the sensing body 8 is provided with separate heating elements 19 for different control circuits, whereat separate light indication is achieved by inserting different control lamps 24 in the different control circuits. By placing the control lamp 24 shown in FIG. 5 on the other side of the bistable relay and introducing a further control lamp connected to the control circuit by the control means 33, separate light indication can be obtained.

When the monitored water-carrying means constitute parts of the distribution network for hot or cold consumption water in a building, the direct-acting thermostat valve, which in this case only serves as an automatic closing valve, constitutes an extra component in comparison with conventional installations. However, in central heating systems such valves are usual. The valve type is simple and cheap, and the variant having a heating element for heating up the sensing body as required for the application of the invention, is therefore suitable for use as a standard type of valve independent of whether it is to affect a flow in the circulation of water, hot water for consumption or cold water for consumption. With regard to consumption water it can in certain cases be sufficient with such a valve in the cold water pipe before the water heater to close off both hot and cold consumption water.

The invention can naturally also be applied to a single-pipe system just as well as the two-pipe system shown in FIG. 1. Furthermore, the heating elements in the sensing bodies of several valves can be supplied via the switch 18 of the relay 17, in spite of only one such heating element being shown in FIG. 3. If there is a risk of leakage from both heating system and consuming system for hot and cold water in one and the same room, it may be necessary to close three valves of the kind in question from one and the same sensing device 16. The invention is thus not limited to the embodiment shown and can be considerably varied within the scope of the claims.

What is claimed is:

1. An apparatus for limiting water damage in structural floors and covering floors in a building which have water-carrying means connected to a central water circulating apparatus, characterized by at least one moisture sensing device positioned at floor level in proximity with said water-carrying means, a relay means connecting said relay to the moisture sensing means, a direct acting thermostatic valve positioned in the central water circulating apparatus supplying the water-carrying means to control the flow of water to the water-carrying means, said valve having a sensing body for actuating the valve, a heating element arranged in proximity with the sensing body, and circuit means connecting said heating element through a source of electric current to said relay to be controlled thereby, said relay being arranged to close the circuit means energizing the heating element from an impulse from the sensing device indicating that a predetermined moisture limit has been exceeded and operative to actuate the thermostatic valve to close the flow of water to the water-carrying means.

2. The apparatus of claim 1 in which the sensing device has a pair of spaced electrical conductors running one alongside the other and embedded in a moisture absorbing material communicating with the floor level, and in which the current source applies a potential drop between the conductors, whereby the relay is operated when a current flow occurs between the conductors through the moisture absorbing material to close the circuit means to the heating element and open the circuit to the sensing device.

3. The apparatus of claim 2 in which the sensing body of the thermostatic valve is enclosed in a chamber, the interior temperature of which is substantially independent of the temperature surrounding the chamber, with the heating element being positioned in the chamber to supply heat to the sensing body and in which there are a plurality of sensing devices positioned at floor level and connected to the relay.

4. The apparatus of claim 3 in which the sensing body consists of a fluid in which the heating element is immersed.

5. The apparatus of claim 3 in which the sensing body is comprised of bimetal means, one side of which mounts the heating element.

6. The apparatus of claim 1 in which the sensing body of the thermostatic valve is enclosed in a chamber whose interior temperature is substantially independent of the temperature surrounding the chamber and with the heating element positioned in the chamber to supply heat to the sensing body.

7. The apparatus of claim 6 and including electrical control means having a timing clock having one or more time settings connected to the relay and operative to close and open the circuit means of the heating element.

8. The apparatus of claim 6 in which the sensing body contains a fluid in which the heating element is immersed.

9. The apparatus of claim 6 in which the sensing body is comprised of bimetal means one side of which is mounted in the heating element.

* * * * *